(No Model.)

F. B. TORREY.
BEARING.

No. 460,409. Patented Sept. 29, 1891.

Attest
Walter Donaldson
James M. Spear

Inventor
Francis B. Torrey
by Ellis Spear
Atty.

UNITED STATES PATENT OFFICE.

FRANCIS BOWEN TORREY, OF BATH, MAINE.

BEARING.

SPECIFICATION forming part of Letters Patent No. 460,409, dated September 29, 1891.

Application filed January 27, 1891. Serial No. 379,255. (No model.)

*To all whom it may concern:*

Be it known that I, FRANCIS BOWEN TORREY, a citizen of the United States of America, residing at Bath, in the county of Sagadahoc and State of Maine, have invented certain new and useful Improvements in Bearings, of which the following is a specification.

Application has been made for Letters Patent of the Dominion of Canada under date January 27, 1891, Serial No. 55,819.

The object of my invention is to provide an anti-friction bearing for journals, and while I describe my invention as used with a bushing I desire it to be understood that my improved bearing may be used in any situation where it is desired to reduce the friction between the journal and bearing, and in an economical manner, without requiring the aid of skilled workmen or machine-fitting, to accurately form a bearing adapted to receive the journal which is to be supported thereby.

Prior to my invention bushings have been provided with indentations and grooves, which are filled with some soft material, such as metalline; but in such cases the bushing has to be fitted accurately and at considerable expense, making the articles so costly as to prevent them from coming into general use. I aim to secure the advantage of the use of a bearing composed of metal and a composition, but to reduce the expense of such a bearing to the minimum, and I effect this by utilizing a ring or a series of rings having the inner wall or walls of a size fitted to the journal and between the rings or series to compress under considerable pressure the composition.

The invention consists, first, of a shell or bushing having a lining of composite material compressed between a flange or shoulder at one end of the bushing-opening and a ring at the opposite end.

The invention consists, secondly, of a bearing composed of a series of rings having open-sided recesses, with the composite material interposed between the rings and compressed.

The invention consists, finally, in the details hereinafter described.

Figure 2:
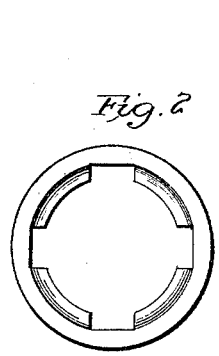
Figure 1:
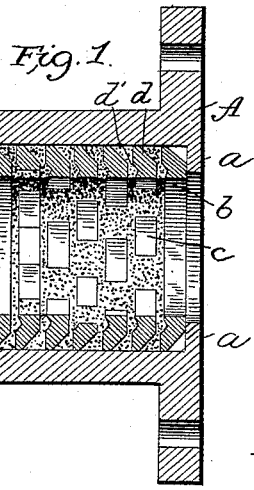
Figure 5:
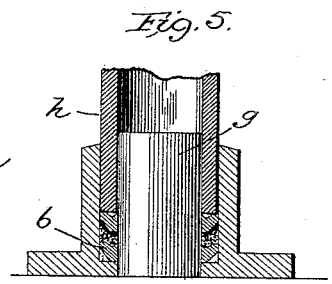
Figure 3:
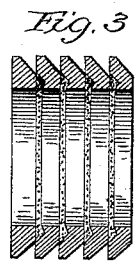
Figure 4:
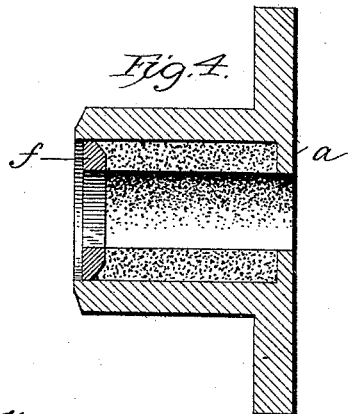

In the drawings, Figure 1 is a sectional view of a bushing; Fig. 2, a detail view of one of the rings; Fig. 3, a modification of the arrangement of rings shown in Fig. 1. Fig. 4 shows a bearing having but one ring, and Fig. 5 represents the method of forming the bearing.

An ordinary bushing, which may be of cast iron or other metal, is indicated at A. It is provided with a flange *a*, overhanging the central opening, and the inner wall of the opening formed thereby may be, as in Fig. 4, of a size adapted to receive the journal, or it may be of greater size, as in Fig. 1, to form simply a shoulder, against which bears the first ring *b* of the series. This ring has a plain inner wall, and while I have shown it independent of the bushing it may be cast therewith. The next ring of the series (marked *c*) is provided with its front edge formed inclined, as at *d*, with an annular depression on its rear face (marked *d'*.) As shown in Fig. 2, this ring and the others of the series, except, preferably, the first and the last, are formed with open-sided recesses, and between the rings and in the recesses is compressed the composition in the manner presently described. Instead of forming the rings with the open-sided recesses, I may, as in Fig. 3, provide the rings with unbroken inner walls; but while in the form of ring first described the recesses would permit the rings to be placed in close contact by reason of the composition filling the recesses and thus breaking the solid metal wall in the form shown in Fig. 3, when the recesses are omitted it is necessary to keep the rings apart by interposing portions of the composition between them. It will be understood that in the form of ring shown in Fig. 1 they are alternated in position, so as to throw the spaces in the rings out of alignment, as indicated.

For light work it will not be found necessary to provide so much metal surface in the bearing as I have shown in Figs. 1 and 3, and I therefore compress the composition into the bushing between the flange *a* and the ring *f*, Fig. 4, at the opposite end, securing this ring in position after compression of the material.

I prefer to use as the composite material lignum-vitæ and plumbago finely pulverized, because of its self-lubricating qualities, the composition being the subject of an application filed by me on the 28th day of March, 1890, Serial No. 345,672; but I do not limit myself to the use of this material in connection with my improved bearings, as other compositions may be found desirable.

It is essential that the composition, whether used between the series of rings, as in Figs. 1 and 3, or the end ring and flange, as in Fig. 4, be subjected to great pressure to secure the best results, and to this end I make the bearing in the following manner: I first provide a former $g$, which is of the size of the journal for which the bearing is to be made, and over this I place the casting forming the bushing or shell. This is preferably cast and requires no accurate fitting. Between the former and the inner wall of this shell the lining is built up by first placing a ring $b$ in position, if this ring is independent of the bushing, and then a layer of the composition, subjecting the composition to pressure by means of a plunger $h$. Then a second ring is put in position, and then another layer of the composition, and so on, the pressure packing the mixture solidly and embedding the rings securely therein by reason of their peculiar formation. The last ring is suitably secured. In making the bearing, as in Fig. 4, the pulverized material is poured in on the flange $a$, and the plunger compresses it in the same manner, a ring being placed in at the end and secured to keep it in place.

The rings and the bushing may be all cast, and it will thus be seen that no machine-fitting is required, but an absolute fit secured.

I claim as my invention—

1. A bearing consisting of a shell or bushing having a lining built up of a composite material interposed under pressure between a flange at one end and a confining-ring at the other, the said flange and ring forming a part of the bearing-surface, substantially as described.

2. A bearing consisting of a series of rings having a composition of lignum-vitæ and plumbago interposed between them and under compression.

3. A bearing consisting of a series of rings, each ring provided with a series of open-sided recesses, and a composite material compressed within said recesses, the recesses alternating in position, substantially as described.

4. A bearing consisting of a series of rings having a composition of pulverized wood and plumbago interposed between them under compression.

5. A bearing consisting of a series of rings within a casing, with a composite material compressed between them, said rings having their front edges formed inclined, with an annular depression on the rear face, substantially as described.

In testimony whereof I affix my signature in presence of two witnesses.

FRANCIS BOWEN TORREY.

Witnesses:
 HENRY E. COOPER,
 F. L. MIDDLETON.